US009920826B2

(12) United States Patent
Yamawaki et al.

(10) Patent No.: US 9,920,826 B2
(45) Date of Patent: Mar. 20, 2018

(54) HOLLOW RACK BAR AND METHOD OF MANUFACTURING HOLLOW RACK BAR

(71) Applicant: NETUREN CO., LTD., Shinagawa-ku, Tokyo (JP)

(72) Inventors: Takashi Yamawaki, Tokyo (JP); Makoto Nomura, Tokyo (JP); Kenichi Aoki, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 345 days.

(21) Appl. No.: 14/435,635

(22) PCT Filed: Oct. 11, 2013

(86) PCT No.: PCT/JP2013/078394
§ 371 (c)(1),
(2) Date: Apr. 14, 2015

(87) PCT Pub. No.: WO2014/061816
PCT Pub. Date: Apr. 24, 2014

(65) Prior Publication Data
US 2015/0276037 A1    Oct. 1, 2015

(30) Foreign Application Priority Data

Oct. 15, 2012  (JP) .................................. 2012-227998

(51) Int. Cl.
*F16H 55/26*  (2006.01)
*B21K 1/76*  (2006.01)

(52) U.S. Cl.
CPC ............. *F16H 55/26* (2013.01); *B21K 1/768* (2013.01); *Y10T 29/49474* (2015.01); *Y10T 74/19* (2015.01)

(58) Field of Classification Search
CPC ................................. F16H 55/26; B21K 1/768
See application file for complete search history.

(56) References Cited

U.S. PATENT DOCUMENTS

| 2003/0097894 A1* | 5/2003 | Ozeki | B21K 1/767 74/422 |
| 2015/0298721 A1* | 10/2015 | Suzuki | B62D 3/126 74/457 |
| 2016/0223065 A1* | 8/2016 | Chang | F16H 55/26 |

FOREIGN PATENT DOCUMENTS

| JP | 10-226339 | 8/1998 |
| JP | 2002-178095 | 6/2002 |
| JP | 2009-262694 | 11/2009 |

OTHER PUBLICATIONS

International Search Report for PCT/JP2013/078394, dated Jan. 23, 2014.

* cited by examiner

*Primary Examiner* — Terence Boes
(74) *Attorney, Agent, or Firm* — Wenderoth, Lind & Ponack, L.L.P.

(57) ABSTRACT

A hollow rack bar and a method of manufacturing the hollow rack bar are provided. The hollow rack bar includes a hollow blank pipe portion having a uniform wall thickness, and a rack toothed portion. The rack toothed portion includes teeth, a flat portion having a flat surface and arranged side by side with the teeth in a direction along a center axis of the blank pipe portion, and a slanted portion provided at an end of the flat portion with respect to a direction perpendicular to the center axis and arranged to be lower than the flat portion. A length of the slanted portion projected on a straight line perpendicular to the center axis and parallel to the surface of the flat portion is longer than zero and equal to or shorter than the wall thickness of the blank pipe portion.

3 Claims, 9 Drawing Sheets

HOLLOW RACK BAR AND METHOD OF MANUFACTURING HOLLOW RACK BAR

TECHNICAL FIELD

The present invention relates to a hollow rack bar having a rack toothed portion and a method of manufacturing the hollow rack bar.

BACKGROUND ART

Rack bars, e.g., rack bars for a steering apparatus of a vehicle, are formed from a hollow metal pipe. For example, a portion of a steel pipe where a rack toothed portion is to be formed is flattened to have a flat outer surface. Then, a female die having a profile corresponding to rack teeth to be formed is pressed against the flattened portion, and a mandrel is inserted into the steel pipe.

By inserting the mandrel into the steel pipe, the flattened portion is pushed outward from the inside and is plastically deformed. With the female die being pressed against the flattened portion, the teeth are formed in accordance with the profile of the female die.

To prevent a burr from being generated when forming the rack teeth by plastic working using the mandrel, the portion of the steel pipe where the rack toothed portion is to be formed may be formed to have a flat portion having the flat outer surface and slanted portions on respective sides of the flat portion (see, e.g., JP 2002-178095 A).

When forming the rack teeth by plastic working from the inside of the pipe member while pressing the female die against the pipe member, the rack teeth are formed to protrude up from their central portions in a widthwise direction of the rack teeth. The widthwise direction of the rack teeth is a direction intersecting the direction in which the rack teeth are arranged side by side.

The width of the rack teeth is increased in proportion to the number of times the mandrel is inserted into the pipe member. Therefore, the number of times the mandrel is inserted into the pipe member is adjusted so that the rack teeth have a required width.

As described above, the rack teeth are formed to protrude up from their central portions in the widthwise direction, and the mandrel is inserted into the pipe member multiple times until the rack teeth have the required width, which requires a certain amount of time.

Further, because the rack teeth are formed to protrude up from their central portions in the widthwise direction, a load is repeatedly applied to a portion of the die that is brought into contact with the central portions of the rack teeth, which may shorten the life of the die.

SUMMARY OF INVENTION

It is an object of the present invention to provide a hollow rack bar and a method of manufacturing the hollow rack bar, according to which the follow rack bar can be manufactured efficiently while suppressing a reduction of life of a die.

According to an aspect of the present invention, a hollow rack bar is provided. The hollow rack bar includes a hollow blank pipe portion having a uniform wall thickness, and a rack toothed portion. The rack toothed portion includes teeth, a flat portion having a flat surface and arranged side by side with the teeth in a direction along a center axis of the blank pipe portion, and a slanted portion provided at an end of the flat portion with respect to a direction perpendicular to the center axis and arranged to be lower than the flat portion. A length of the slanted portion projected on a straight line perpendicular to the center axis and parallel to the surface of the flat portion is longer than zero and equal to or shorter than the wall thickness of the blank pipe portion.

According to another aspect of the present invention, a method of manufacturing a hollow rack bar is provided. The method includes forming a flat portion and a slanted portion on a rack forming portion of a hollow blank pipe member to form a rack forming preparatory portion, the rack forming portion having a uniform wall thickness, the flat portion having a flat surface, and the slanted portion being provided at an end of the flat portion with respect to a direction perpendicular to a center axis of the blank pipe member and arranged to be lower than the flat portion, bringing a teeth forming die into contact with the rack forming preparatory portion, and plastically deforming the rack forming preparatory portion from an inner side of the rack forming preparatory portion toward the teeth forming die. A length of the slanted portion projected on a straight line perpendicular to the center axis and parallel to the surface of the flat portion is longer than zero and equal to or shorter than the wall thickness of the blank pipe member.

DESCRIPTION OF EMBODIMENTS

Figure 1:
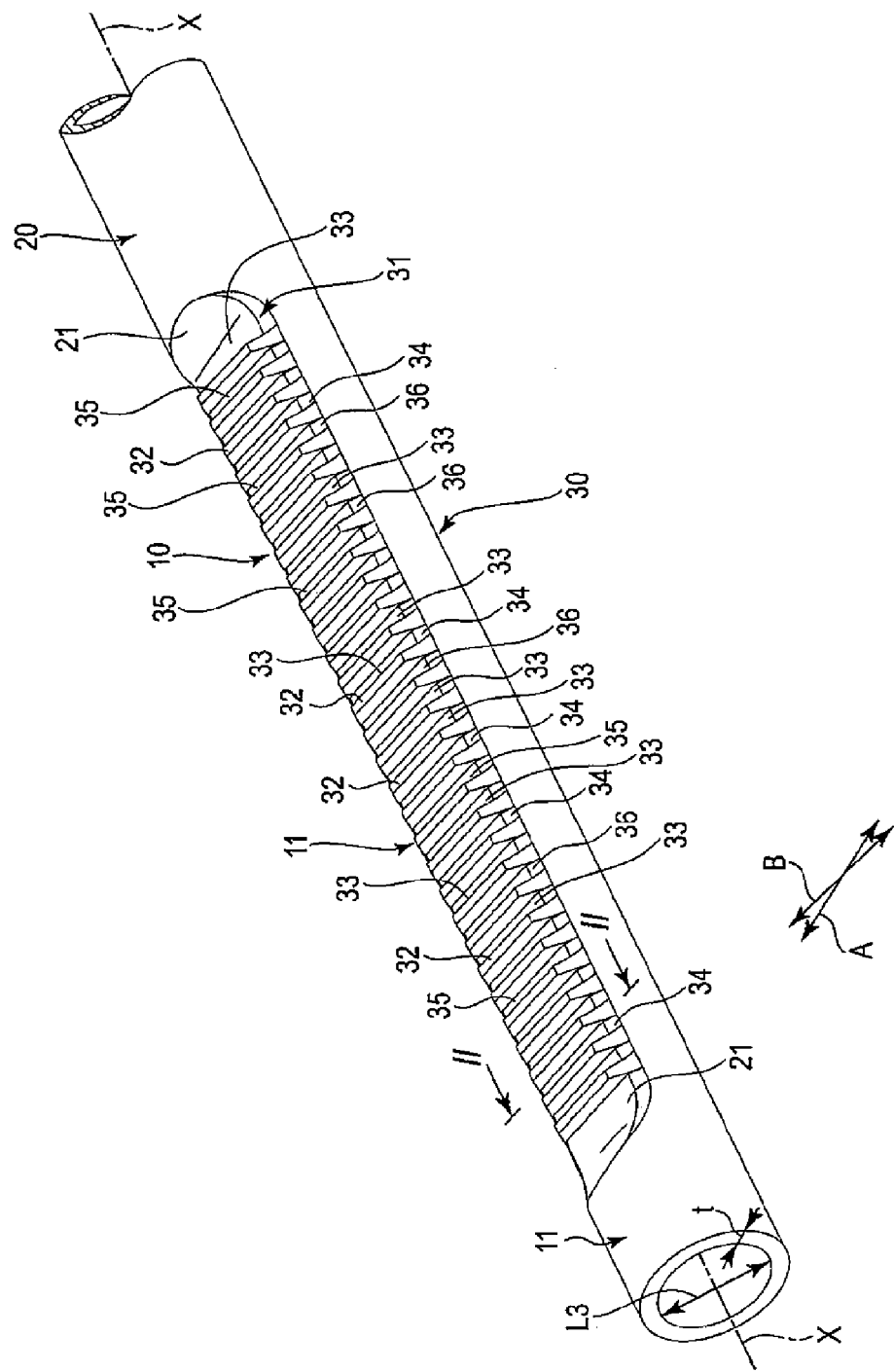
FIG. 1 is a perspective view of a rack bar according to a first embodiment of the present invention.

A hollow rack bar and a method of manufacturing the hollow rack bar according to a first embodiment of the present invention will be described with reference to FIGS. 1 to 9. FIG. 1 is a perspective view of a rack bar 10, an example of the hollow rack bar. The rack bar 10 is used in, for example, a steering apparatus of a vehicle.

As shown in FIG. 1, the rack bar 10 includes a blank pipe portion 20 and a rack toothed portion 30. The blank pipe portion 20 is a portion of the rack bar 10 other than the rack toothed portion 30. The blank pipe portion 20 has a hollow shape and both ends of the blank pipe portion 20 in a direction of the center axis X are opened. In FIG. 1, one end portion 11 of the rack bar 10 is shown and the other end portion thereof is omitted. However, the other end is also opened, like the one end shown in FIG. 1.

In a cross section of the blank pipe portion 20 taken along the plane perpendicular to the center axis X, an outer edge of the blank pipe portion 20 has a circular shape, and an inner edge of the blank pipe portion 20 has a circular shape that is coaxial with the circular shape of the outer edge. The center axis X is a straight line passing through a center of the circular shape of the outer edge and a center of the circular shape of the inner edge. A wall thickness t of the blank pipe portion 20 in a direction perpendicular to the center axis X is the same in any location. That is, the blank pipe portion 20 has a uniform wall thickness. The wall thicknesss is defined between the outer edge and the inner edge, and is a length along a straight line perpendicular to the center axis X and extending from the center axis X.

The rack toothed portion 30 includes a recess 31 and teeth 32 formed on the recess 31. The recess 31 extends along the center axis X. The recess 31 includes a flat portion 33 and slanted portions 34. The teeth 32 are formed to protrude outward from the flat portion 33.

Figure 2:
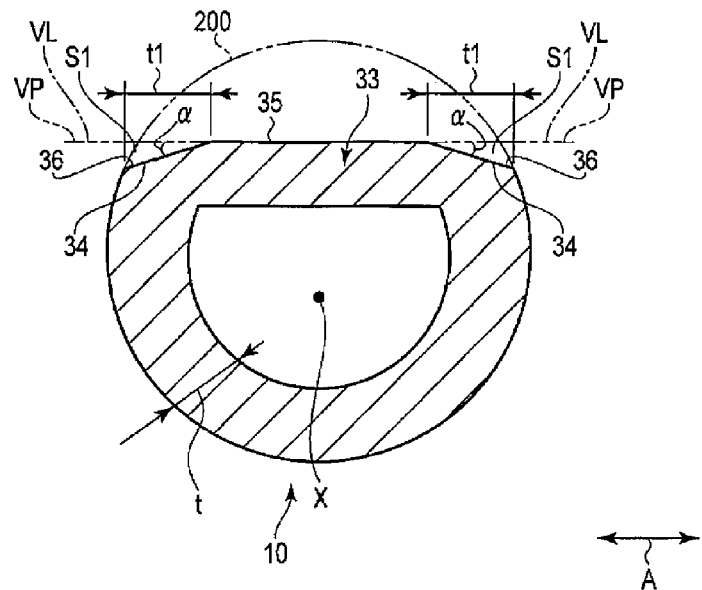
FIG. 2 is a sectional view of the rack bar, taken along the line II-II in FIG. 1.

FIG. 2 is a sectional view of the rack bar 10, taken along the line II-II in FIG. 1. That is, FIG. 2 shows a cross section of the rack bar 10 taken at the flat portion 33 along the plane perpendicular to the center axis X. A virtual circle 200 is indicated in FIG. 2. The virtual circle 200 is a circle formed by the outer edge of the blank pipe portion 20 in the cross section of the blank pipe portion 20 taken along the plane perpendicular to the center axis X. A portion of the virtual circle 200 that is common to an outer edge of the cross section of the rack bar 10 taken at the recess 31 is illustrated to overlap the outer edge of the cross section of the rack bar 10.

The flat portion 33 may have a shape as shown in FIG. 2 at any position along the center axis X. As shown in FIG. 2, a surface 35 of the flat portion 33 is a horizontal surface and is a flat surface that forms a part of a chord of the virtual circle 200 in the cross section taken along the plane perpendicular to the center axis X.

The slanted portion 34 is respectively formed at both ends of the flat portion 33 with respect to a direction perpendicular to the center axis X. The slanted portions 34 are inclined downward relative to the surface 35 of the flat portion 33. The surface 36 of each of the slanted portions 34 is a flat surface that is continuous from the corresponding end of the surface 35 of the flat portion 33, parallel to the center axis X, forms a part of a chord of the virtual circle 200 in the cross section taken along the plane perpendicular to the center axis X, and is inclined with respect to the surface 35.

Next, the surfaces 35, 36 will be described in more detail. An angle α formed by a plane VP extended from and parallel to the surface 35 and the surface 36 of the slanted portion 34 is uniform over a range in which the teeth 32 are formed. In other words, the angle α is uniform over a range between the tooth 32 arranged at one end and the tooth 32 arranged at the other end along the center axis X.

A length of the surface 36 of the slanted portion 34 vertically projected on a virtual straight line VL is denoted by t1. The virtual straight line VL is perpendicular to the center axis X and is parallel to the surface 35 of the flat portion 33. The length t1 is equal to or shorter than the wall thickness t.

The teeth 32 are formed in the flat portion 33. Each tooth 32 has a profile protruding from the surface 35 of the flat portion 33. The teeth 32 are extended along a second direction B intersecting with a first direction A. The first direction A is perpendicular to the center axis X and is parallel to the surface 35 of the flat portion 33. A connection portion 21 connecting the recess 31 of the rack toothed portion 30 and the blank pipe portion 20 is smoothly formed.

Figure 3:
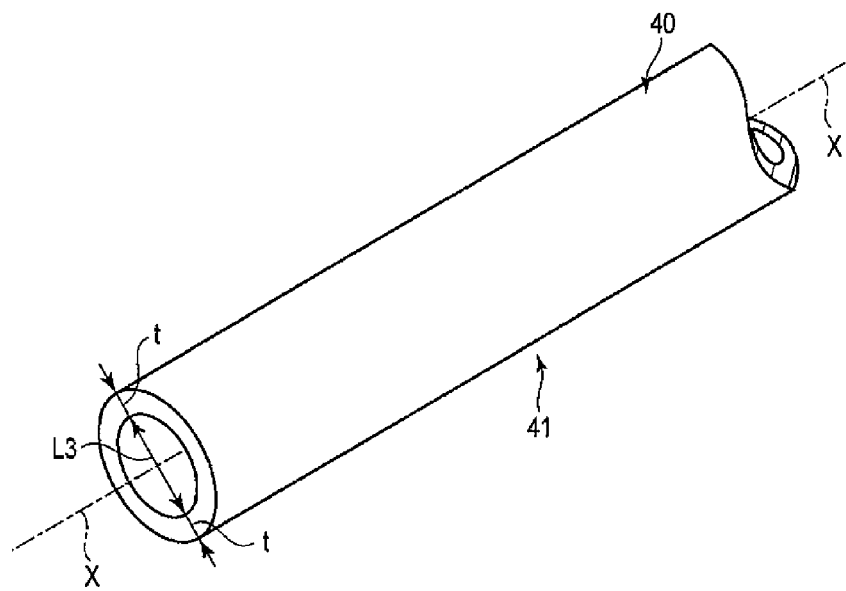
FIG. 3 is a perspective view of a steel pipe used for forming the rack bar.

Next, an example of a method for manufacturing the rack bar 10 will be described. FIG. 3 is a perspective view of a steel pipe 40, an example of a blank pipe member for forming the rack bar 10. The rack bar 10 is formed from the steel pipe 40. In FIG. 3, the steel pipe 40 is illustrated with its longitudinal central portion being omitted.

As shown in FIG. 3, the steel pipe 40 is a cylinder having a wall thickness t. That is, the steel pipe has a hollow shape. The steel pipe 40 includes a rack forming portion 41 on which a rack toothed portion is formed. Before forming the rack toothed portion, the rack forming portion 41 has the same shape as the other portion of the steel pipe 40. In other words, the rack forming portion 41 is an area in which the rack toothed portion 30 is formed.

Thus, in a cross section taken along the first direction A perpendicular to the center axis X, the steel pipe 40 has the wall thickness t at any locations in a range of the rack forming portion 41.

Figure 4:
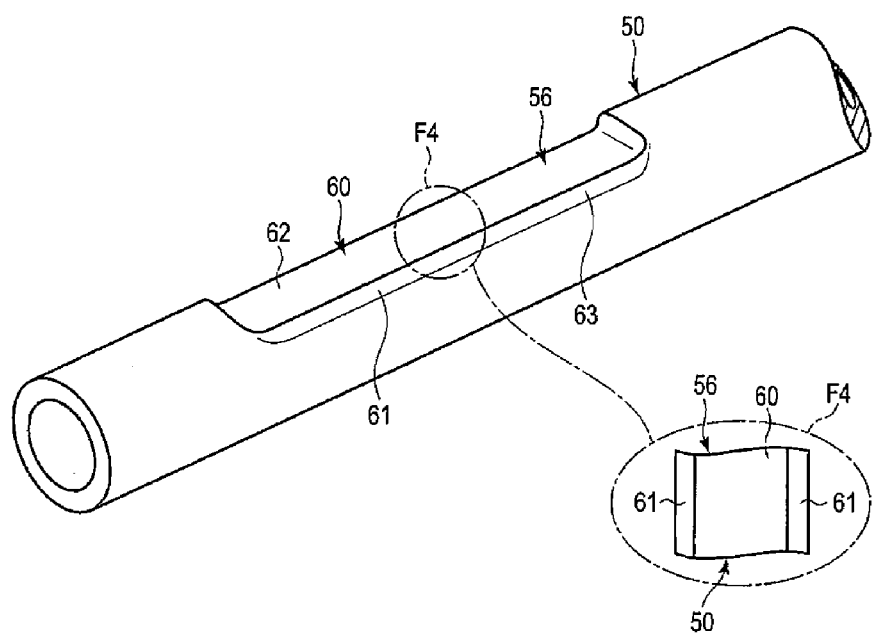
FIG. 4 is a perspective view of a primary molded piece formed from the steel pipe.

In order to form the rack bar 10, first, a primary molded piece 50 is formed from the steel pipe 40. FIG. 4 is a perspective view of the primary molded piece 50. As shown in FIG. 4, the primary molded piece 50 is obtained by shaping the steel pipe 40 using a primary molding apparatus 51. The primary molded piece 50 will be described in detail below.

Figure 5:
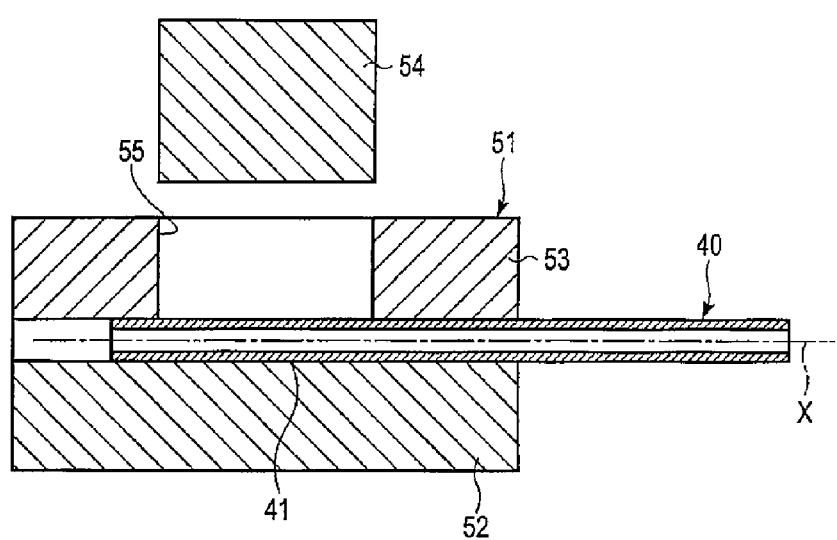
FIG. 5 is a sectional view taken along the center axis of the steel pipe, illustrating a state in which the steel pipe is placed inside a primary molding apparatus.
Figure 6:
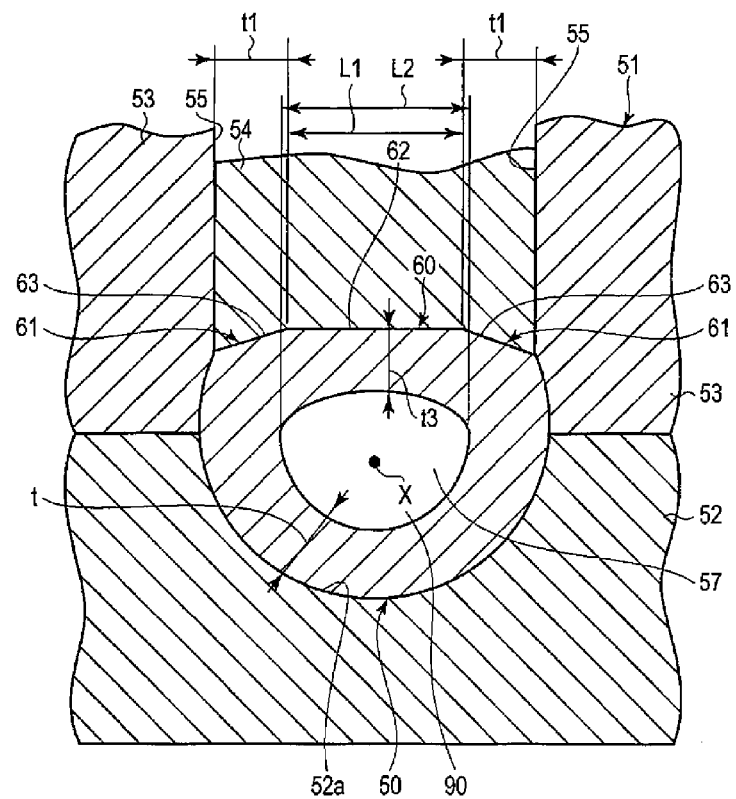
FIG. 6 is a sectional view taken along the plane perpendicular to the central axis of the primary molded piece, illustrating a state in which the primary molded piece is formed by the primary molding apparatus.

FIGS. 5 and 6 are sectional views illustrating a state in which the primary molded piece 50 is produced from the steel pipe 40 using the primary molding apparatus 51. FIG. 5 is a sectional view taken along the center axis X of the steel pipe 40, illustrating a state in which the steel pipe 40 is placed in the primary molding apparatus 51. As shown in FIG. 5, the primary molding apparatus 51 includes a lower supporting split mold 52, an upper supporting split mold 53 and a punch 54. The lower supporting split mold 52 is adapted to support a lower portion of the steel pipe 40. The upper supporting split mold 53 is adapted to support an upper portion of the steel pipe 40.

FIG. 6 is a sectional view taken in a direction perpendicular to the central axis X of the primary molded piece 50, illustrating a state in which the primary molded piece 50 is formed by the primary molding apparatus 51. FIG. 6 shows a state where the primary molded piece 50 is fixed in the primary molding apparatus 51.

As shown in FIGS. 5 and 6, a through hole 55 is formed in a portion of the upper supporting split mold 53 corresponding to the rack forming portion 41. The through hole 55 penetrates the upper supporting split mold 53. The punch 54 can be inserted into the through hole 55. The through hole 55 has the same size as the rack forming portion 41 of the steel pipe 40.

By inserting the punch 54 into the through hole 55 and pressing the punch 54 against the rack forming portion 41 of the steel pipe 40, as shown in FIG. 6, the rack forming portion is recessed to form a rack forming preparatory portion 56, as shown in FIG. 4.

The steel pipe 40 is provided in the primary molding apparatus 51 so that the rack forming portion 41 is opposed to the through hole 55. Therefore, the punch 54 is pressed against the rack forming portion 41 when the punch 54 is inserted into the through hole 55. FIG. 6 illustrates a cross section of the primary molded piece 50 taken at the rack forming preparatory portion 56.

As shown in FIGS. 4 and 6, the rack forming preparatory portion 56 of the primary molded piece 50 includes a flat portion 60 and a slanted portion 61. The flat portion 60 is the same as the flat portion 33 of the rack bar 10 described above. The difference is that teeth 32 protrude from the surface 35 of the flat portion 33 of the rack bar 10 but the teeth 32 are not yet formed on the flat portion 60 of the primary molded piece 50. The slanted portion 61 of the primary molded piece 50 is the same as the slanted portion 34 of the rack bar 10. Therefore, the shape defined by an outer peripheral edge of the rack toothed portion 30 of the rack bar 10 shown in FIG. 2 is the same as the shape defined by an outer peripheral edge of the rack forming preparatory portion 56 of the primary molded piece 50 shown in FIG. 6.

The teeth 32 are formed on the primary molded piece 50 by using a teeth forming apparatus 70 to form the rack bar 10. In other words, a part of the flat portion 60 and the slanted portion 61 of the primary molded piece 50 are formed as the flat portion 33 and the slanted portion 34 of the rack bar 10.

Figure 7:
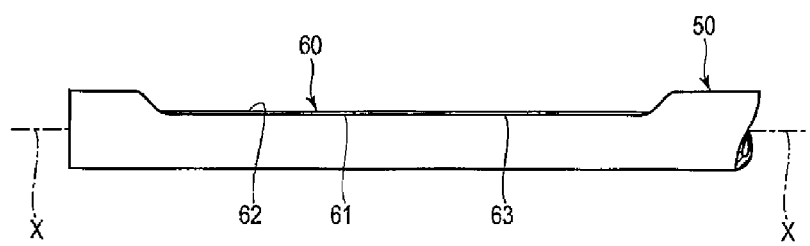
FIG. 7 is a side view of the primary molded piece.

FIG. 7 is a side view of the primary molded piece 50. FIG. 7 shows the primary molded piece 50 viewed from a direction perpendicular to the center axis X of the primary molded piece 50 and parallel to a surface 62 of the flat portion 60. A portion F4 in FIG. 4 is a plan view showing a part of the flat portion 60 of the primary molded piece 50. As shown in FIG. 4 and FIG. 7, the slanted portions 61 are formed at both ends of the flat portion 60.

Figure 8:
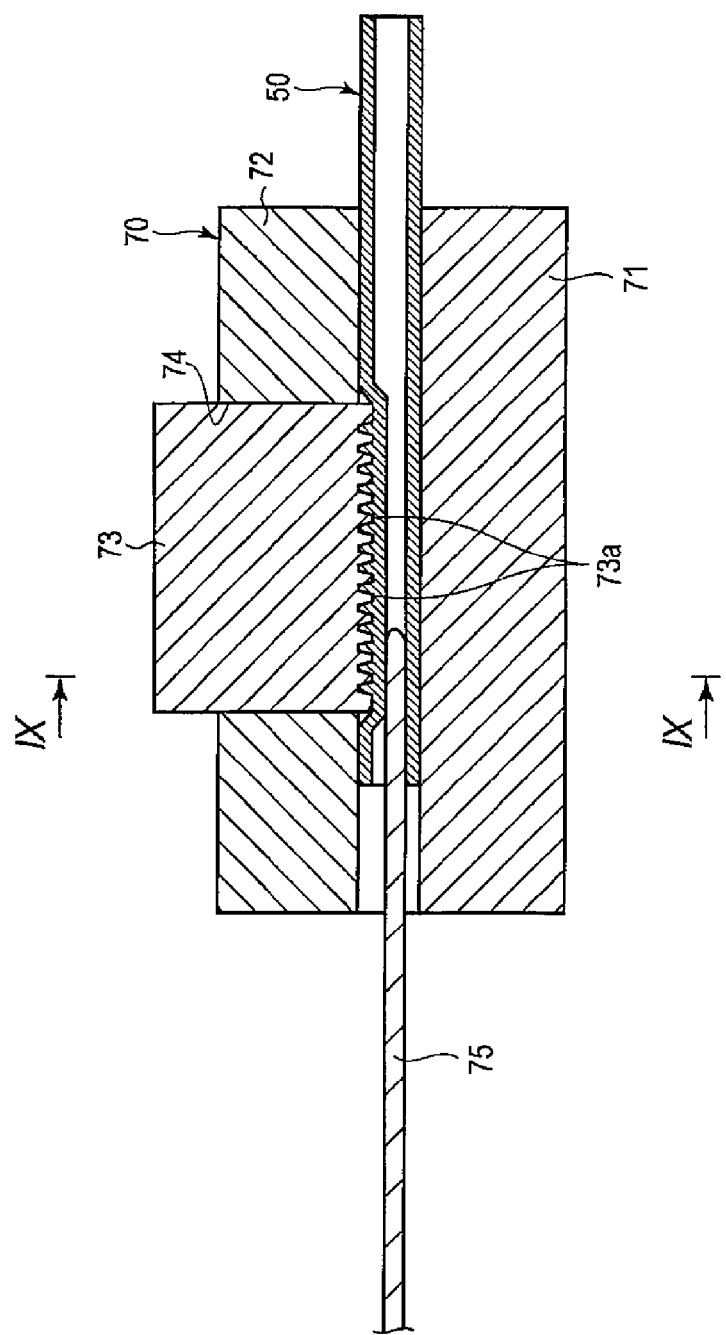
FIG. 8 is a sectional view taken along the center axis of the rack bar, illustrating a state in which the rack bar is placed in a teeth forming apparatus.
Figure 9:
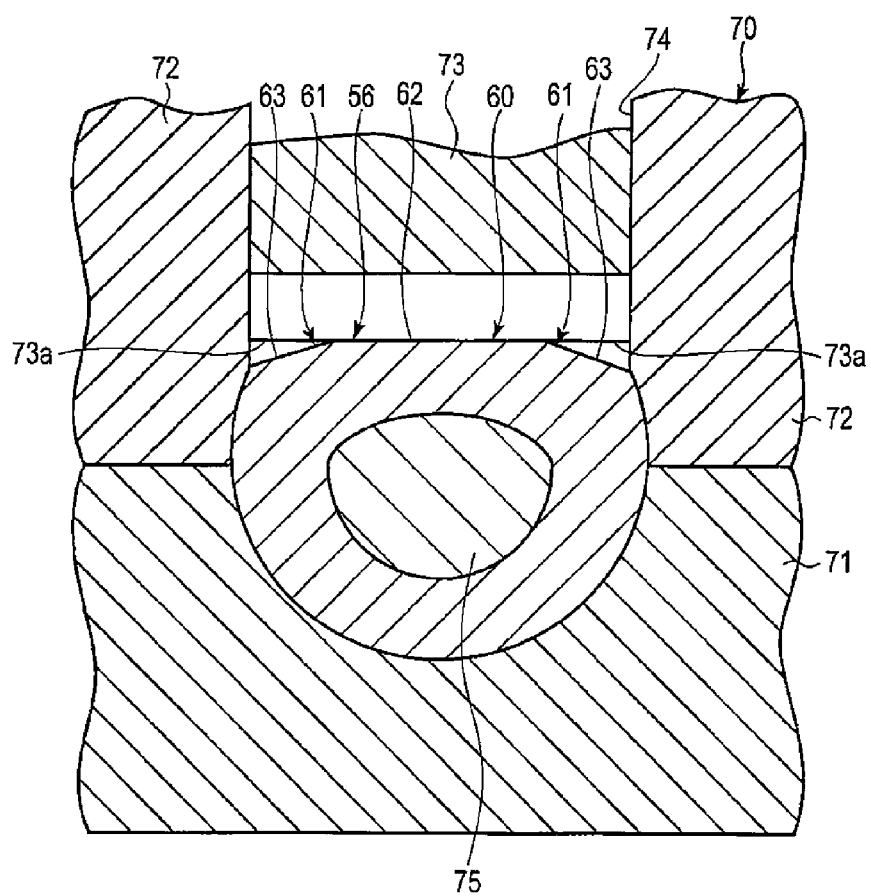
FIG. 9 is a sectional view of the rack bar and the teeth forming apparatus, taken along the line IX-IX in FIG. 8.

FIG. 8 is a sectional view taken along the center axis X of the rack bar 10 and being perpendicular to the surface 35 of the flat portion 33, illustrating a state in which the rack bar 10 is placed in the teeth forming apparatus 70. FIG. 9 is a sectional view showing the rack bar 10 and the teeth forming apparatus 70, taken along the line IX-IX in FIG. 8. FIG. 9 shows the rack toothed portion 30 of the rack bar 10 a portion of the teeth forming apparatus 70 near the rack toothed portion 30.

As shown in FIGS. 8 and 9, the teeth forming apparatus 70 includes a lower supporting split mold 71, an upper supporting split mold 72 and a teeth forming die 73. The lower supporting split mold 71 and the upper supporting split mold 72 may be the same as the lower supporting split mold 52 and the upper supporting split mold 53 of the primary molding apparatus 51.

The teeth forming die 73 has a shape corresponding to the profile of the teeth to be formed. As shown in FIGS. 8 and 9, the teeth forming die 73 is brought into contact with the surface 62 of the flat portion 60 of the rack forming preparatory portion 56 through a through hole 74 of the upper supporting split mold 72. The primary molded piece 50 is provided in the teeth forming apparatus 70 so that the rack forming preparatory portion 56 is opposed to the through hole 74 in an insertion direction of the teeth forming die 73. In this state, the primary molded piece 50 is plastically deformed from the inner side of the primary molded piece 50 by inserting a mandrel 75 into the primary molded piece 50.

The teeth forming die 73 has the recessed configuration corresponding to the teeth 32 to be formed. Distal ends 73*a* of the teeth forming die 73 are brought into contact with the surface 62 of the flat portion 60 and have a shape parallel to the surface 62. FIG. 9 shows the recessed portions of the teeth forming die 73 corresponding to the teeth 32.

By plastically deforming the rack forming preparatory portion 56 from the inner side of the rack forming preparatory portion 56 of the primary molded piece 50 toward the teeth forming die 73, the regions of the flat portion 60 of the rack forming preparatory portion 56 on which the teeth 32 are formed are protruded. In this way, the teeth 32 are formed. Multiple types of mandrels 75 are inserted into the primary molded piece until a tooth height and a tooth width required for the teeth 32 are obtained.

As described above, the primary molded piece 50 is formed from the steel pipe 40 using the primary molding apparatus 51, and then the rack bar 10 is formed from the primary molded piece 50 using the teeth forming apparatus 70. In this way, it is possible to effectively form the teeth 32, and also to prevent the life of the teeth forming die 73 from being shortened.

As shown in FIGS. 2 and 6, in the rack forming preparatory portion 56 and the rack toothed portion 30, the length t1 of the slanted portions 34, 61 projected on a virtual straight line perpendicular to the center axis X and parallel to the surfaces 35, 62 of the flat portions 33, 60 is equal to or shorter than the wall thickness t of the steel pipe 40. Accordingly, the wall thickness t3 of the flat portion 60 of the primary molded piece 50 is thicker than the wall thickness t of the steel pipe 40, i.e., t3>t. The wall thickness t3 is a length along a direction perpendicular to the surface 62 of the flat portion 60. This point will be described in detail.

The lower supporting split mold 52 of the primary molding apparatus 51 is provided with a recess 52*a* for supporting the steel pipe 40 and the recess 52*a* has an arc shape conforming to an arc shape of a surface of the steel pipe 40. A region of the upper supporting split mold 53 other than the through hole 55 has an arc shape conforming to an arc shape of a surface of the steel pipe 40. The portion of the punch 54 that is in contact with the rack forming portion 41 has a shape corresponding to the flat portion 60 and the slanted portion 61 of the primary molded piece 50.

When the rack forming portion 41 of the steel pipe 40 is pressed by the punch 54 and therefore the flat portion 60 and the slanted portion 61 are formed, the wall thickness of the flat portion 60 and the slanted portion 61 is increased by the recessed amount, as compared with other portions of the steel pipe. Further, since the slanted portion 61 is simultaneously formed, the flat portion 60 is pushed up to the center of the steel pipe along the first direction A from the slanted portion 61 side. Accordingly, the wall thickness t3 of the rack forming preparatory portion 56 of the primary molded piece 50 becomes thicker than the wall thickness t of the steel pipe 40.

Further, because the length t1 of the slanted portion 61 projected on a straight line perpendicular to the center axis X and parallel to the surface 62 of the flat portion 60 is equal to or shorter than the wall thickness t of the steel pipe 40, the length L1 of the flat portion 60 in the first direction A is shorter than the length L2 of an inside through hole 90 of the primary molded piece 50 from one end to the other end thereof in the first direction A. Accordingly, the length L2 of the through hole 90 in the first direction A is equal to a diameter L3 of an inside through hole of the steel pipe 40. Alternatively, it is possible to suppress a reduction amount of L2 even when L2 becomes shorter than L3.

When the length t1 of the slanted portion 61 in the first direction A, i.e., the length t1 of the slanted portion 61 projected on a straight line parallel to the surface 62 of the flat portion 60 is longer than the wall thickness t of the steel pipe 40, the length L2 of the through hole 90 of the primary molded piece 50 in the first direction A is shorter than the diameter L3 of the inside through hole of the steel pipe 40 in accordance with the formation of the slanted portion 61 and the reduction amount of L2 relative to L3 is increased.

When the reduction amount of the length L2 of the through hole 90 of the primary molded piece 50 in the first direction A relative to the diameter L3 of the inside through hole of the steel pipe 40 is increased, the size of a mandrel used in the plastic working needs to be reduced. That is, because the size of the through hole 90 is reduced, the size of the mandrel 75 to be inserted into the through hole 90 needs to be reduced accordingly.

As the size of the mandrel 75 is reduced, the pushing up amount of the flat portion 60 is decreased. As the pushing up amount is decreased, it is necessary to increase the number of times the mandrel 75 is inserted. For this reason, the number of plastic working for achieving a required tooth height and tooth width is increased and therefore it is difficult to effectively form the teeth 32.

In contrast, according to the present embodiment, t1≤t. Therefore, the wall thickness t3 of the flat portion 60 of the primary molded piece 50 prior to the plastic working can be thicker than the wall thickness t1 of the steel pipe 40 and it is possible to prevent the size of the through hole 90 of the primary molded piece 50 from being reduced. Further, it is possible to lengthen the length of the flat portion 60 in the first direction A.

By increasing the wall thickness of the flat portion 60, it is possible to increase the pushing up amount of the teeth that is obtained by a single plastic working. Further, by increasing the length of the flat portion 60 in the first direction A, it is possible to obtain a sufficient pushing up amount also over a width direction in a single plastic working. In addition, since it is possible to prevent the size of the through hole 90 of the primary molded piece 50 from being reduced, a larger mandrel 75 can be used.

Therefore, the teeth 32 can be formed with reduced number of the plastic working. Since it is possible to reduce the number of the plastic working, the load on the teeth forming die 73 can be made small. Thus, it is possible to prevent the life of the mold from being shortened.

As shown in FIG. 1, the slanted portion 61 of the primary molded piece 50 remains as a slanted portion 34 in the rack bar 10, as described above.

Next, a hollow rack bar and a method of manufacturing the hollow rack bar according to a second embodiment of the present invention will be described with reference to FIGS. 10 to 14. Here, a configuration having the same function as that of the first embodiment is denoted by the same reference numeral as that of the first embodiment and a description thereof is omitted. The second embodiment is different from the first embodiment in that a punch 80 is used, instead of the punch 54 used when forming the primary molded piece 50 and in that the primary molded piece 50 has a different shape. The differences will be described in detail.

Figure 10:
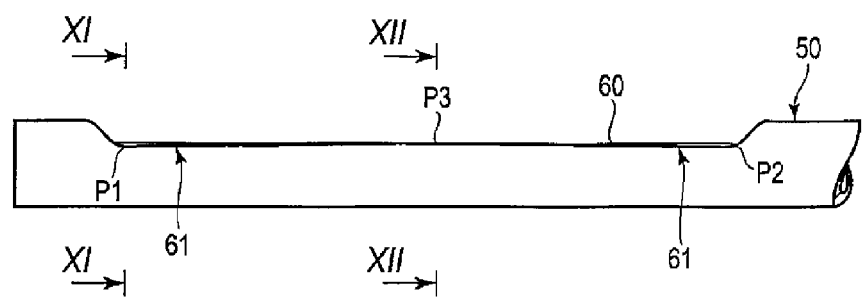
FIG. 10 is a side view of a primary molded piece for forming a rack bar according to a second embodiment of the present invention.
Figure 11:
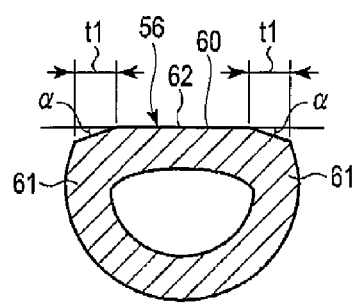
FIG. 11 is a sectional view of the primary molded piece, taken along the line XI-XI in FIG. 10.
Figure 12:
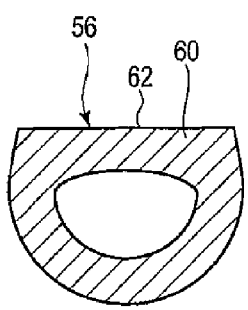
FIG. 12 is a sectional view of the primary molded piece, taken along the line XII-XII in FIG. 10.

FIG. 10 is a side view of the primary molded piece 50 of the second embodiment. FIG. 11 is a sectional view of the primary molded piece, taken along the line XI-XI in FIG. 10. FIG. 11 shows a cross section of the rack forming preparatory portion 56 taken along the plane perpendicular to the center axis X at one end P1 of the rack forming preparatory portion 56. FIG. 12 is a sectional view of the primary molded piece, taken along the line XII-XII in FIG. 10. FIG. 12 shows a cross section of the rack forming preparatory portion 56 taken along the plane perpendicular to the center axis X at the middle P3 of the rack forming preparatory portion 56 along the center axis X.

As shown in FIG. 11, the rack forming preparatory portion 56 is configured such that the flat portion 60 and the slanted portion 61 are provided at one end P1 of the rack forming preparatory portion 56, as in FIG. 6 of the first embodiment. The rack forming preparatory portion 56 shown in FIG. 11, in other words, the flat portion 60 and the slanted portion 61 have the same shape as the rack forming preparatory portion 56 of the first embodiment.

As shown in FIG. 12, the rack forming preparatory portion 56 has a shape in which the slanted portion 61 is not provided but only the flat portion 60 is provided at the middle P3 of the rack forming preparatory portion 56. As shown in FIG. 11, the rack forming preparatory portion 56 is configured such that an angle α of the slanted portion 61 is gradually decreased toward the middle P3 from one end P1 along the center axis X of the rack forming preparatory portion 56 and the angle α formed by the slanted portion 61 and the virtual plane VP becomes zero at the middle P3. Therefore, the rack forming preparatory portion 56 has a shape in which only the flat portion 60 is provided at the middle P3 along the center axis X of the rack forming preparatory portion 56.

The shape of the other end of the rack forming preparatory portion 56 is the same as in FIG. 11. Further, the rack forming preparatory portion 56 is configured such that the angle α of the slanted portion 61 is decreased toward the middle P3 along the center axis X from the other end P2 thereof. Specifically, the change in the shape of the rack forming preparatory portion 56 generated toward the middle P3 from the one end P1 along the center axis X, i.e., the change in the angle α of the slanted portion 61, is the same as the change in the shape thereof generated toward the middle P3 from the other end P2, i.e., the change in the angle α of the slanted portion 61. As a result, the angle α is decreased along the center axis X from both sides of a range in which the teeth 32 are provided toward the middle of the range, and is zero at the middle of the range.

Figure 13:
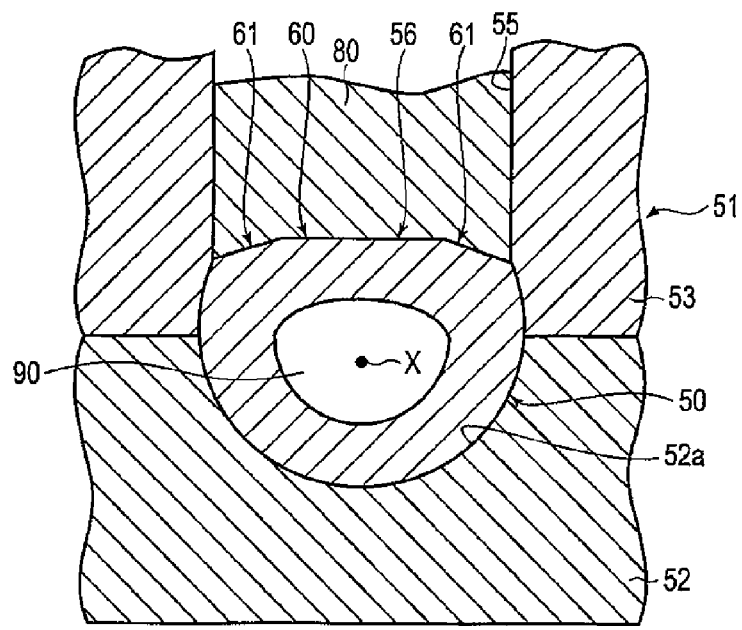
FIG. 13 is a sectional view taken along the plane perpendicular to the center axis at one end of a rack forming preparatory portion along the center axis, illustrating a state in which the primary molded piece is produced.
Figure 14:
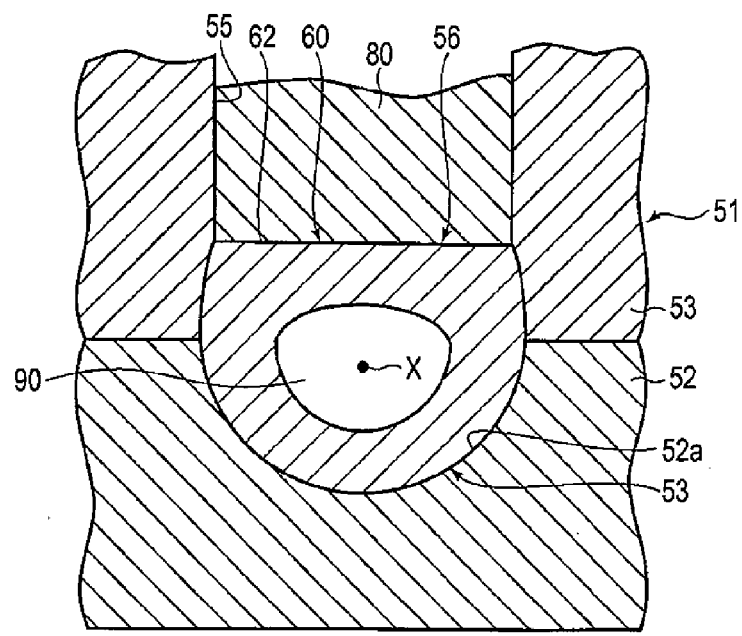
FIG. 14 is a sectional view taken along the plane perpendicular to the center axis at the middle of the rack forming preparatory portion along the center axis, illustrating a state in which the primary molded piece is produced.

In the primary molding apparatus 51 used to produce the primary molded piece 50 of the second embodiment, the punch 80 is used, instead of the punch 54. FIGS. 13 and 14 are sectional views illustrating a state in which the primary molded piece 50 is formed.

FIG. 13 is a sectional view taken in a direction perpendicular to the center axis X at one end along the center axis X, illustrating a state in which the primary molded piece 50 is produced. As shown in FIG. 13, the region of the punch 80 corresponding to the region between both ends P1, P2 of the rack forming preparatory portion 56 and the portion just before the middle P3 has a shape corresponding to the slanted portion 61. The region of the punch 80 opposed to the other end P2 of the rack forming preparatory portion 56 has the same shape as in FIG. 13. FIG. 14 is a sectional view of the primary molded piece 50 taken in a direction perpendicular to the center axis X at the middle P3 along the center axis X.

In addition to the effects of the first embodiment, according to the present embodiment, it is also possible to further prevent the life of the teeth forming die 73 from being shortened. This point will be described in detail.

When plastically deforming the rack forming preparatory portion 56 by inserting the mandrel 75 into the primary molded piece 50, there is a tendency that the teeth 32 are easily formed at an early stage at the middle P3 along the center axis X of the rack forming preparatory portion 56.

Therefore, when the slanted portion at the middle P3 along the center axis X of the rack forming preparatory portion 56 becomes smaller than the slanted portion at both ends along the center axis X of the rack forming preparatory portion 56 and the angle α between the surface 63 of the slanted portion 61 of the rack forming preparatory portion 56 and the surface 62 of the flat portion 60 is decreased toward the middle P3 from both ends P1, P2, as in the second embodiment, it is possible to retard the formation of the teeth 32 toward the middle P3 from both ends P1, P2 along the center axis X of the rack forming preparatory portion 56.

With this configuration, early formation of the teeth 32 is balanced out at the middle P3 along the center axis X of the rack forming preparatory portion 56 and therefore the teeth 32 are formed in a substantially uniform manner at all positions along the center axis X. In other words, the change in the angle α between the surface 63 of the slanted portion 61 and the surface 62 of the flat portion 60 from both ends P1, P2 toward the middle P3 is configured such that the growing speed of the teeth 32 in the rack forming preparatory portion 56 becomes uniform at all positions along the center axis X.

When the teeth 32 at the middle P3 along the center axis X of the rack forming preparatory portion 56 are formed at an early stage, it is still necessary to plastically deform the rack forming preparatory portion 56, by inserting the mandrel 75 into the primary molded piece 50 until the teeth 32 are formed on both ends P1, P2 along the center axis X. In this case, load is applied to the region of the teeth forming die 73 opposed to the teeth 32 that are formed at the middle P3 along the center axis X of the rack forming preparatory portion 56.

However, according to the second embodiment, the teeth 32 grow in a substantially uniform manner at all positions along the center axis X of the rack forming preparatory portion 56, as described above. Accordingly, it is possible to reduce the load on the teeth forming die 73.

In the embodiments described above, the rack bar 10 is an example of a hollow rack bar. The teeth 32 are an example of teeth of the hollow rack bar. The flat portion 33 is an example of the flat portion of the hollow rack bar. The slanted portion 34 is an example of the slanted portion of the hollow rack bar. The steel pipe 40 is an example of a blank pipe member. For example, the rack bar 10 may be formed from a pipe member that is made of other metals. The rack forming portion 41 is an example of a rack forming portion of the blank pipe member. The rack forming preparatory portion 56 is an example of a rack forming preparatory portion. The teeth forming die 73 is an example of a teeth forming die. The punches 54, 80 are examples of a flat portion forming die.

The present invention is not limited to the embodiments described above, and various changes and modifications may be made therein to implement the present invention without departing from the scope of the present invention as defined by the claims.

INDUSTRIAL APPLICABILITY

One or more embodiments of the invention provide a hollow rack bar and a method of manufacturing the hollow rack bar, according to which the follow rack bar can be manufactured efficiently while suppressing a reduction of life of a die.

This application is based on Japanese Patent Application No. 2012-227998 filed on Oct. 15, 2012, the entire content of which is incorporated herein by reference.

The invention claimed is:

1. A hollow rack bar comprising:
   a hollow blank pipe portion having a uniform wall thickness; and
   a rack toothed portion comprising teeth, a flat portion having a flat surface and arranged side by side with the teeth in a direction along a center axis of the blank pipe portion, and a slanted portion provided at an end of the flat portion with respect to a direction perpendicular to the center axis and arranged to be lower than the flat portion,
   wherein a length of the slanted portion projected on a straight line perpendicular to the center axis and parallel to the surface of the flat portion is longer than zero and equal to or shorter than the wall thickness of the blank pipe portion and wherein an angle formed by a plane extended from and parallel to the surface of the flat portion and a surface of the slanted portion is decreased along the center axis from both sides of a range in which the teeth are provided toward a middle of the range, and is zero at the middle of the range.

2. A method of manufacturing a hollow rack bar, comprising:
   forming a flat portion and a slanted portion on a rack forming portion of a hollow blank pipe member to form a rack forming preparatory portion, the rack forming portion having a uniform wall thickness, the flat portion having a flat surface, and the slanted portion being provided at an end of the flat portion with respect to a direction perpendicular to a center axis of the blank pipe member and arranged to be lower than the flat portion;
   bringing a teeth forming die into contact with the rack forming preparatory portion; and
   plastically deforming the rack forming preparatory portion from an inner side of the rack forming preparatory portion toward the teeth forming die,
   wherein a length of the slanted portion projected on a straight line perpendicular to the center axis and parallel to the surface of the flat portion is longer than zero and equal to or shorter than the wall thickness of the blank pipe member and wherein an angle formed by a plane extended from and parallel to the surface of the flat portion and a surface of the slanted portion is decreased along the center axis from both sides of a range in which the teeth are provided toward a middle of the range, and is zero at the middle of the range.

3. The method according to claim 2, wherein the rack forming preparatory portion is formed by pressing a flat portion forming die against the rack forming portion.

* * * * *